(12) United States Patent
Gerkens

(10) Patent No.: US 12,345,620 B2
(45) Date of Patent: *Jul. 1, 2025

(54) METHOD AND MEASUREMENT DEVICE FOR DETERMINING A MEASUREMENT VARIABLE OF PARTICLES IN AN AEROSOL

(71) Applicant: Opus Inspection, Inc., East Granby, CT (US)

(72) Inventor: Stefan Gerkens, Freiburg (DE)

(73) Assignee: Opus Inspection, Inc., East Granby, CT (US)

( * ) Notice: Subject to any disclaimer, the term of this patent is extended or adjusted under 35 U.S.C. 154(b) by 277 days.

This patent is subject to a terminal disclaimer.

(21) Appl. No.: 17/961,159

(22) Filed: Oct. 6, 2022

(65) Prior Publication Data

US 2023/0152198 A1     May 18, 2023

Related U.S. Application Data

(63) Continuation of application No. PCT/EP2021/053819, filed on Feb. 17, 2021.

(30) Foreign Application Priority Data

Apr. 8, 2020 (DE) .................. 102020109885.5

(51) Int. Cl.
*G01N 15/02* (2024.01)
*G01N 15/06* (2024.01)
*G01N 15/00* (2006.01)

(52) U.S. Cl.
CPC .............. *G01N 15/06* (2013.01); *G01N 15/02* (2013.01); *G01N 2015/0046* (2013.01)

(58) Field of Classification Search
CPC .............................. G01N 15/02; G01N 15/06
See application file for complete search history.

(56) References Cited

U.S. PATENT DOCUMENTS

| 5,214,386 | A | | 5/1993 | Singer | |
|---|---|---|---|---|---|
| 5,954,845 | A | * | 9/1999 | Willeke | G01N 1/2205 55/331 |
| 2018/0231448 | A1 | * | 8/2018 | Moenkemoeller | G01N 15/1459 |

\* cited by examiner

*Primary Examiner* — Herbert K Roberts
(74) *Attorney, Agent, or Firm* — Von Rohrscheidt Patents

(57) ABSTRACT

A method for determining a measurement variable of particles in an aerosol, the method including feeding at least one sample of the aerosol to a measuring device of a measuring apparatus; determining a particle distribution specific information; determining a particle loss from the particle distribution specific information; and correcting a measurement value of the measurement variable as a function of the particle loss.

14 Claims, 2 Drawing Sheets

METHOD AND MEASUREMENT DEVICE FOR DETERMINING A MEASUREMENT VARIABLE OF PARTICLES IN AN AEROSOL

RELATED APPLICATIONS

This application is a continuation of international application PCT/EP2021/053819 filed on Feb. 17, 2021 that claims priority from German patent application DE 10 2020 109 885.5 filed on Apr. 8, 2020, both of which are incorporated in their entirety by this reference.

FIELD OF THE INVENTION

The invention relates to a method for determining a measurement variable of particles in an aerosol including feeding at least one sample of the aerosol to a sensor of a measuring device.

BACKGROUND OF THE INVENTION

Generic methods are known and can be used e.g. to determine a particle size distribution, a center of gravity of the particle size distribution or a total number concentration.

It has become evident that a captured aerosol sample advantageously has to be fed to the measuring device by a capture system in order to perform the method. The particles in the aerosol can precipitate in the capture system or the measuring device or can precipitate otherwise. Thus, a precipitation rate varies as a function of a geometry of the capture system and the measuring device, a flow velocity and the particle size. Due to different precipitation mechanisms particles with different sizes can be precipitated at different rates. This can cause measurement errors that are difficult to predetermine. This reduces a measurement precision of the measurement device.

BRIEF SUMMARY OF THE INVENTION

Thus, it is an object of the invention to improve a measurement precision of the measurement method.

The object is achieved by a method with the following features; feeding at least one sample of the aerosol to a measuring device of a measuring apparatus, determining a particle distribution specific information, determining a particle loss from the particle distribution specific information, and correcting a measurement value of the measurement variable as a function of the particle loss; and a measuring device with the following features: a sensor configured to determine a measurement variable of particles in an aerosol, a capture device configured to capture a sample of the aerosol and configured to feed the probe to the sensor, and devices configured to determine a particle distribution specific information and to determine a particle loss from the particle distribution specific information and to correct a measurement value as function of the particle loss.

The method according to the invention includes:
  determining a particle distribution specific information;
  determining a particle loss from the particle distribution specific information; and
  correcting a measurement value of measurement variable as a function of the particle loss.

This has the advantage that measurement errors can be corrected that occur due to the processes that run differently for different particle sizes. The particle distribution specific information thus initially quantifies the current particle size distribution. The particle loss derived therefrom can thus be determined based on the current particle size and can therefore be more precise than an estimated particle loss. Thus, the measurement value can be corrected more precisely so that a more precise measurement result is attainable overall.

The determined particle loss can advantageously be a function of the particle size. Alternatively, one or plural particle loss values can be determined for discrete particle sizes. Thus, a measurement value can be corrected with a particle loss that is appropriate for the measurement value or a measurement value.

In an advantageous embodiment at least one characteristic particle size of the aerosol is determined as a particle specific information. This characteristic particle size is used for determining a value for the particle loss. This way only one value for the particle loss is required and neither plural values nor a function derived from the particle size have to be determined. Thus, a correction of the measurement value can be performed in a simpler and quicker manner.

In an advantageous embodiment the characteristic particle size is determined from the particle size distribution of the aerosol. Thus, a correction of the measurement values can be performed that is adapted to a respective application.

In one embodiment the characteristic particle size is determined from a mean geometric particle diameter of the aerosol.

In a particularly advantageous embodiment, the geometric mean particle diameter of the aerosol is measured. This measurement can be performed by a particle measurement apparatus. The particle measurement apparatus can also be part of a measuring device so that determining the particle size can be performed during operations or at least in an operating condition.

In an advantageous embodiment a particle loss due to system geometry is computed. This can be advantageously performed using known particle size driven precipitation mechanism for particles. However, alternatively and/or additionally other system parameters can be considered.

The characteristic particle size can be predetermined or known, e.g. when the aerosol to be measured has a known characteristic particle size.

In an advantageous embodiment the particle loss is determined empirically. Thus, a particle concentration can be measured e.g. at an aerosol inlet and at an aerosol outlet of the measuring device. The particle loss, however, can also be measured in a different manner. This way a precise determination of the particle loss can be performed considering all relevant parameters during operations.

In an advantageous embodiment the particle loss is determined for the characteristic particle size or for each characteristic particle size. Thus, a particle loss can be determined for different relevant particle sizes so that a more precise correction of the measurement values can be performed during operations.

It is particularly advantageous when the particle loss is depicted as a correction factor or as a coefficient of a correction function.

In an advantageous embodiment the particle loss is individually determined for a measuring device which facilitates a very precise correction of the measurement values that is adapted to the respective application.

The particle loss can also be determined as a transfer function for a class of measuring devices. Thus, the particle loss is only determined once and used for all comparable measuring devices and for all measuring devices of the same type. Thus, an individual determination of the particle loss can be omitted so that set up and start up are much simpler and a production of the measuring device simpler and more cost effective.

In an advantageous embodiment, the measuring device is configured as an exchangeable probe or the measuring device includes an exchangeable probe. The particle loss that is characteristic for the measuring device is then manually or automatically transmitted to a piece of measuring equipment in which the measuring device is used when the probe is changed. This way changed particle losses can be automatically considered when the probe is changed without requiring an input or action by the operator.

In an advantageous embodiment the particle loss is determined in a calibration measurement when producing the probe and stored in a memory of the probe. This way a measuring device can read the particle loss when connecting the probe or read the particle loss any time from the memory and use it for correcting the measurement values.

The invention also relates to a measuring device including a sensor for determining a measuring variable of particles in an aerosol and a capture device for capturing a sample of the aerosol and for feeding the sample to the sensor wherein the measuring device includes devices for determining particle distribution specific information, for determining a particle loss from the particle distribution specific information and for correcting a measuring value based on the particle loss.

In an advantageous embodiment the measuring device includes a replaceable probe and the characteristic particle loss is transmitted to the measuring device manually or automatically. This way various probes can be used and the correction of the measurement values can be performed respectively using the exact particle losses.

In an advantageous embodiment the characteristic particle loss for the replaceable probe is stored in a memory of the probe and available for automatic transmission to the measuring device. The characteristic particle loss can be determined once for a probe type during production and stored in the memory.

In an advantageous embodiment the measuring device includes a particle measuring apparatus for determining the mean geometric particle diameter of the aerosol as a particle distribution specific information. This way the particle loss can be determined in situ and thus reflects the particle loss during the measurement. Thus, the error correction is very precise.

BRIEF DESCRIPTION OF THE DRAWINGS

The invention is subsequently described based on advantageous embodiments with reference to drawing figures, wherein.

DETAILED DESCRIPTION OF THE INVENTION

Figure 1:
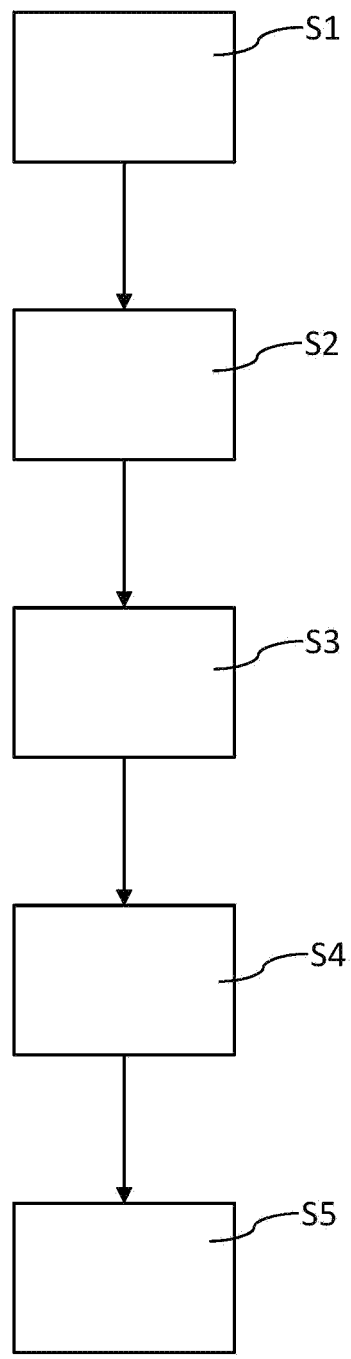
FIG. 1 illustrates a flow diagram of a method according to the invention.

FIG. 1 illustrates a flow diagram of a method according to the invention for determining a measurement variable of particles in an aerosol.

In step S1 a sample of the aerosol is captured and fed to a measuring device.

In a second step S2, a particle distribution specific information is determined. This particle distribution specific information can be at least one characteristic particle size of the aerosol. The characteristic particle size can be determined or known from the mean geometric particle diameter of the aerosol or other particle size metrics.

In a subsequent step S3 a particle loss is determined from the particle distribution specific information. The particle loss can be determined from a single value that characterizes the particle size distribution, e.g. the mean geometric diameter or can be described by a particle diameter derived function.

Eventually a measurement value S4 is determined and the measurement value is corrected as a function of the particle loss S5.

Figure 2:
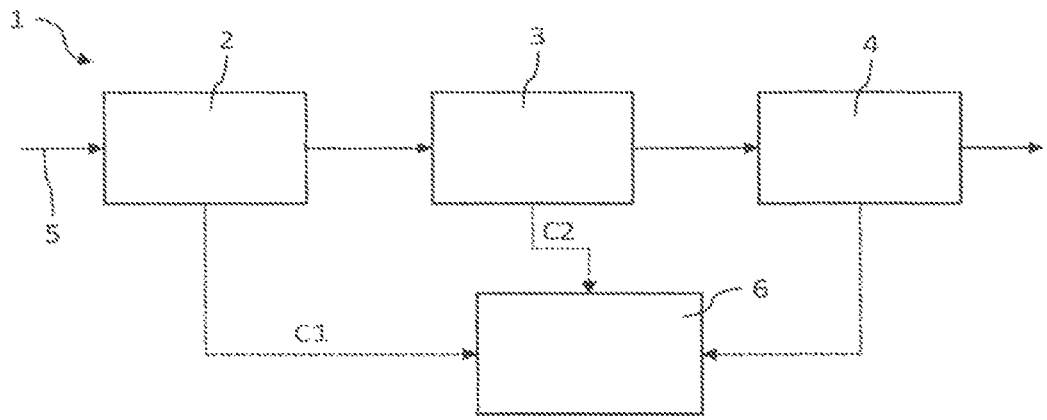
FIG. 2 illustrates a block diagram of a measuring device according to the invention.

FIG. 2 schematically illustrates a measuring apparatus 1 with a probe 2, additional system components 3, and a particle measuring device 4. The particle measuring device can be e.g. a diffusion charging sensor, DC sensor. The aerosol 5 that is to be measured is run over the probe 2 into the measuring apparatus 1 and fed to the particle measuring apparatus 4. Additional system components 3 can be arranged there between and the aerosol 5 is run through these additional system components. These additional system components can be components that are required e.g. for cooling hot exhaust gases and/or other components required for processing of the aerosol.

In this embodiment the measuring device 1 includes a processor 6 that is configured for performing a method according to the invention e.g. according to FIG. 1.

The probe 2 is configured in the embodiment as an exchangeable probe including a memory in which the characteristic particle loss of the probe 2 is stored. This characteristic particle loss is transmitted to the processor 6 when the probe 2 is connected. The steps S2 and S3 therefore only require reading the transmitted value.

The processor 6 is connected with the sensor 4 for capturing the measurement value. The measurement values can be corrected in the processor 6 as a function of the particle losses.

Figure 3:
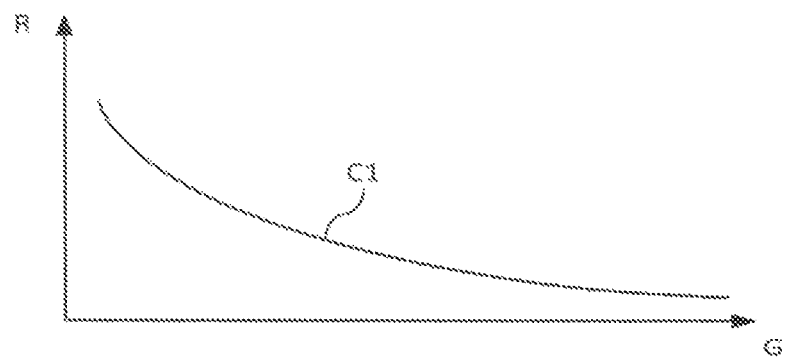
FIG. 3 illustrates a diagram of a first particle size dependent particle loss.

FIG. 3 illustrates the characteristic particle loss C1 of the probe 2 as a function of the particle loss R depending on the particle size G.

Figure 4:
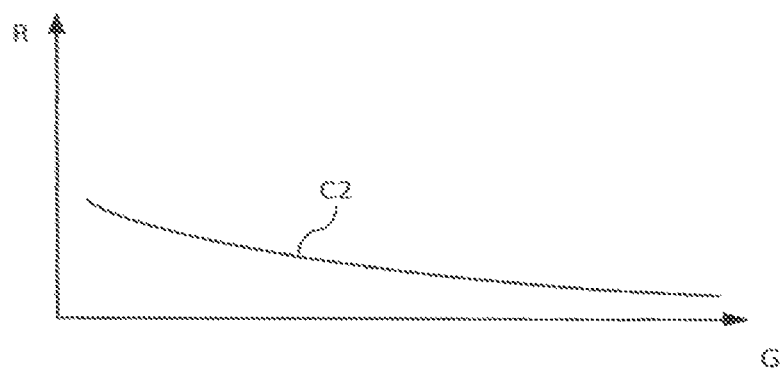
FIG. 4 illustrates a diagram of a second particle size dependent particle loss.

FIG. 4 shows the characteristic particle loss C2 of the system components 3 as a function of the particle loss R depending from the particle size G. In this embodiment the curve C2 runs flatter than the curve C1.

The processor 6 computes a correction value from the two characteristic particle losses wherein the measurement values are corrected with the correction value.

REFERENCE NUMERALS AND DESIGNATIONS 1 measuring apparatus
2 probe
3 system components
4 particle measuring device
5 aerosol
8 processor
C1 characteristic particle loss of probe
C2 characteristic particle loss of system components
S1-S5 process steps

What is claimed is:

1. A method for determining an indicator of particles in an aerosol, the method comprising the steps of:

feeding at least one sample of the aerosol through a replaceable probe to a measuring device of a measuring apparatus;

defining a characteristic particle size from a measured mean geometric particle diameter of the aerosol;

reading a characteristic particle loss of the replaceable probe corresponding to the characteristic particle size from a memory of the replaceable probe;

measuring a metric of the indicator;

calculating a particle loss from the metric and the characteristic particle loss; and correcting the metric of the indicator as a function of the particle loss.

2. The method according to claim 1, wherein the mean geometric particle diameter of the aerosol is measured by a particle measuring apparatus.

3. The method according to claim 1, wherein the particle loss is computed based on a geometry of a capture device configured to capture a sample of the aerosol and configured to feed the sample to the sensor based on known size dependent precipitation mechanisms for particles.

4. The method according to claim 1, wherein the characteristic particle loss is determined empirically by measuring a particle concentration at an aerosol input and at an aerosol output of the measuring apparatus based on a known particle size or particle size distribution of the aerosol.

5. The method according to claim 2, wherein the characteristic particle loss is determined for the characteristic particle size or for each characteristic particle size, and wherein the characteristic particle loss is computed into a correction factor or a coefficient of a correction function.

6. The method according claim 4, wherein the characteristic particle loss is individually determined for the measuring device or as a transfer function for a class of measuring devices.

7. The method according to claim 6, wherein the measuring device is configured as an insertable probe, and wherein the characteristic particle loss of the measuring device is transmitted to the measuring apparatus manually or automatically when the probe is inserted.

8. The method according to claim 7, wherein the characteristic particle loss is determined in a calibration measurement during production of the insertable probe and stored in the memory of the insertable probe.

9. The method according to claim 1, wherein the characteristic particle loss includes effects of system components for processing the aerosol.

10. The method according to claim 1, wherein the effects of system components for processing the aerosol include cooling hot exhaust gases.

11. The method according to claim 1, wherein the particle loss is computed based on a geometry of a capture device configured to capture a sample of the aerosol and configured to feed the sample to the sensor.

12. A measuring apparatus that determines a measurement value of aerosols, comprising:

a sensor configured to determine an indicator of particles in an aerosol;

a replaceable probe including memory; and a capture device configured to capture a sample of the aerosol and configured to feed the sample through replaceable probe to the sensor;

wherein a characteristic particle size from a measured mean geometric particle diameter of the aerosol is determined, wherein a characteristic particle loss of the replaceable probe based upon on the characteristic particle size is read from information in the memory replaceable probe, and wherein a measurement value of the aerosol is corrected as function of the particle loss.

13. The measuring apparatus according to claim 12, wherein the characteristic particle loss is manually or automatically transmitted to the measuring apparatus when the replaceable probe is inserted.

14. The measuring apparatus according to claim 13, wherein the characteristic particle loss is stored in the memory of the replaceable probe configured for automatic transmission to the measuring apparatus.

* * * * *